United States Patent [19]

Darby

[11] 4,392,602
[45] Jul. 12, 1983

[54] METHOD OF MAKING SANDWICH STRUCTURES BY SUPERPLASTIC FORMING AND DIFFUSION BONDING

[75] Inventor: Vene L. Darby, Redondo Beach, Calif.

[73] Assignee: Rockwell International Corporation, El Segundo, Calif.

[21] Appl. No.: 209,570

[22] Filed: Nov. 24, 1980

[51] Int. Cl.³ .............................................. B23K 20/18
[52] U.S. Cl. ..................................... 228/118; 228/157
[58] Field of Search ....................... 228/118, 215, 157; 427/259

[56] References Cited

U.S. PATENT DOCUMENTS

| | | | |
|---|---|---|---|
| 3,831,246 | 8/1974 | Morris | 228/118 X |
| 3,927,817 | 12/1975 | Hamilton et al. | 228/157 |
| 3,934,441 | 1/1976 | Hamilton et al. | 72/60 |
| 4,093,754 | 6/1978 | Parsons | 427/259 |
| 4,220,276 | 9/1980 | Weisert et al. | 228/118 |
| 4,295,255 | 10/1981 | Weber | 228/157 X |

Primary Examiner—Kenneth J. Ramsey
Attorney, Agent, or Firm—Charles T. Silberberg

[57] ABSTRACT

An improvement is disclosed to the method of forming sandwich structures wherein a plurality of workpieces having opposed principal surfaces are placed in a stack contacting facing principal surfaces and thereafter diffusion bonding portions of said facing principal surfaces of said workpieces together and superplastic forming at least a portion of at least one of said workpieces. The improvement comprises coating at least one of the facing principal surfaces with a maskant. The maskant is then removed from the portions not to be diffusion bonded of the at least one coated facing principal surface. A stopoff material is applied to the portions where the maskant has been removed and thereafter the remaining maskant is removed. The preferred method of removing the maskant from the portion of the at least one coated principal surface comprises placing a template on the surface and thereafter cutting out the maskant. In one embodiment prior to the step of applying the stopoff the portions of the at least one facing principal surface where the maskant has been removed is etched to a depth equal to the thickness of the stopoff material to be applied. This allows the tolerance between opposed facing principal surfaces to be reduced when the workpieces are tubular in form.

4 Claims, 10 Drawing Figures

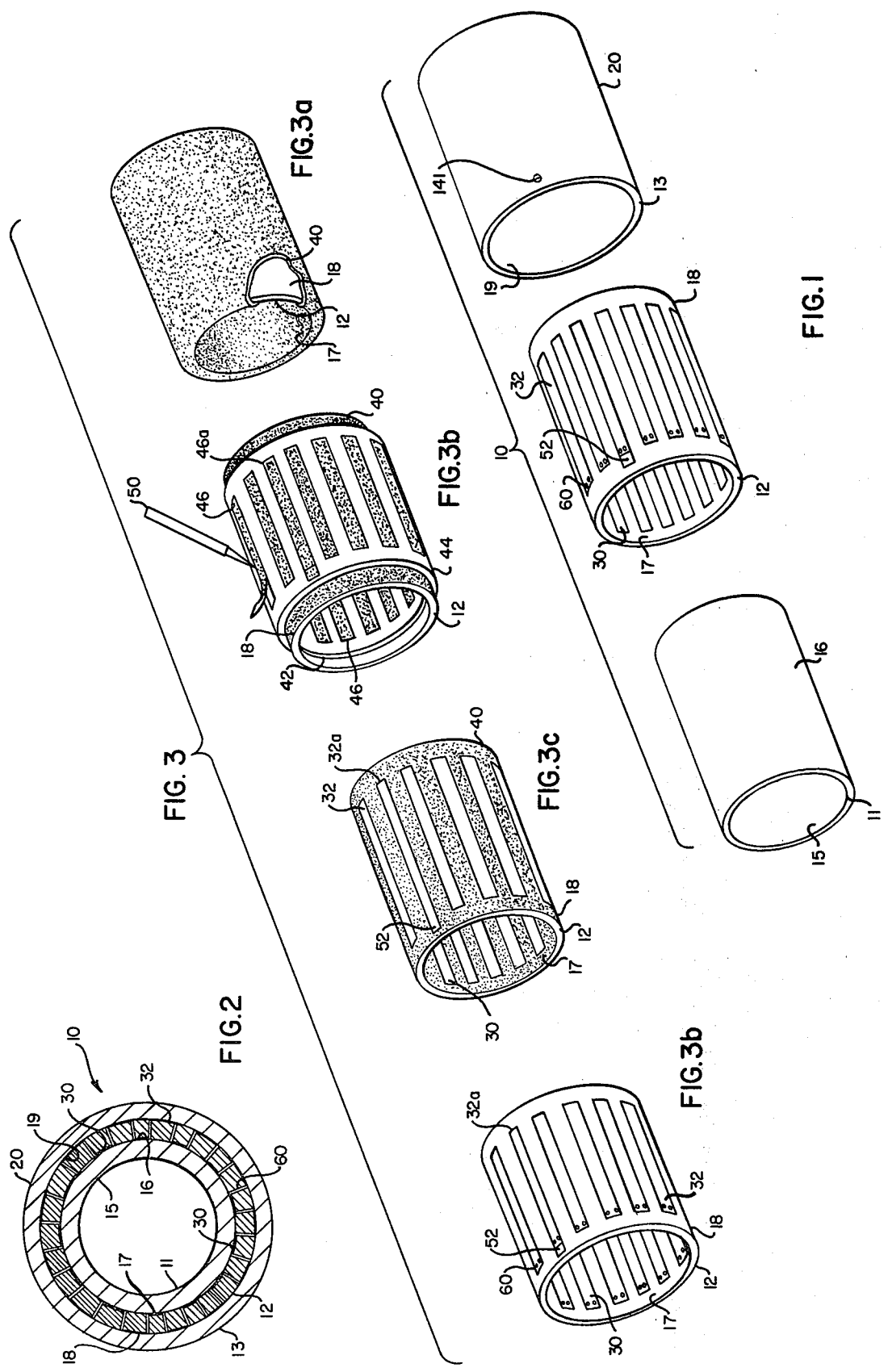

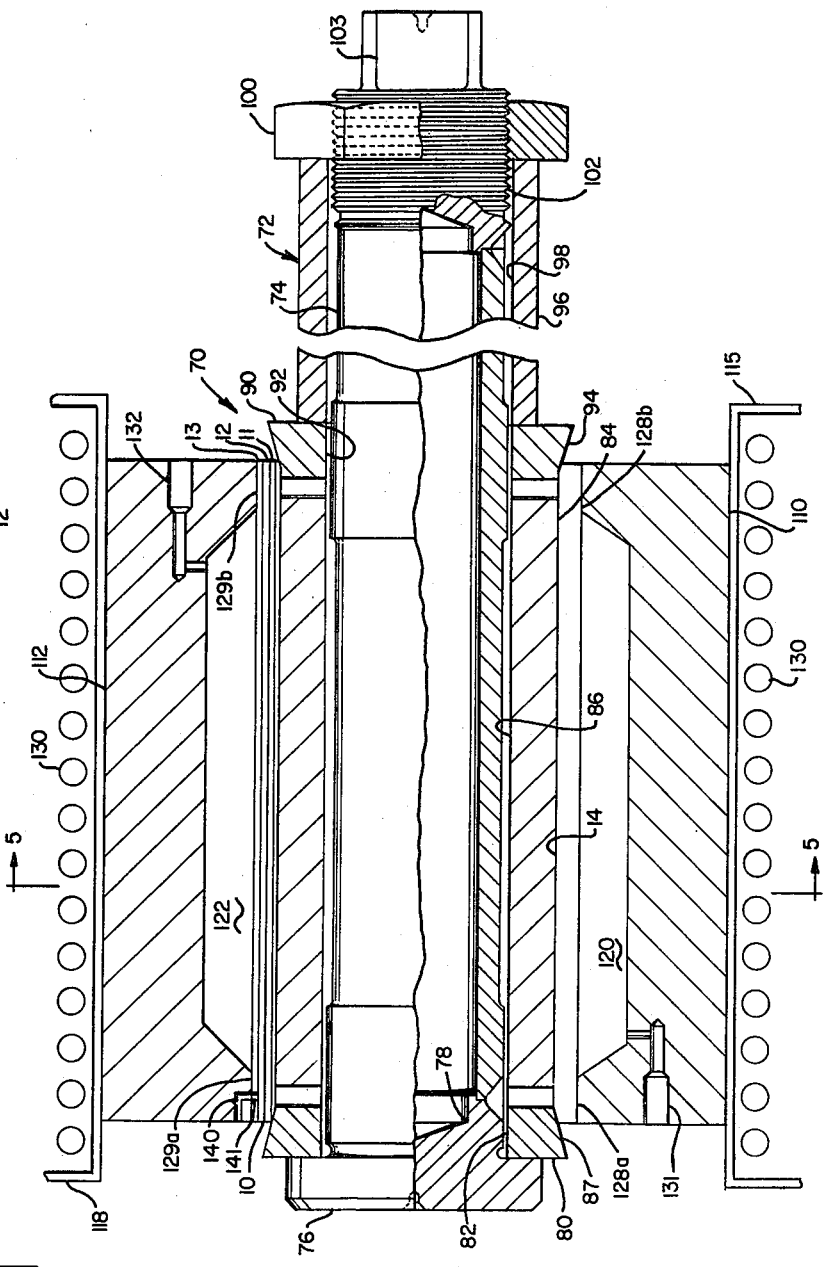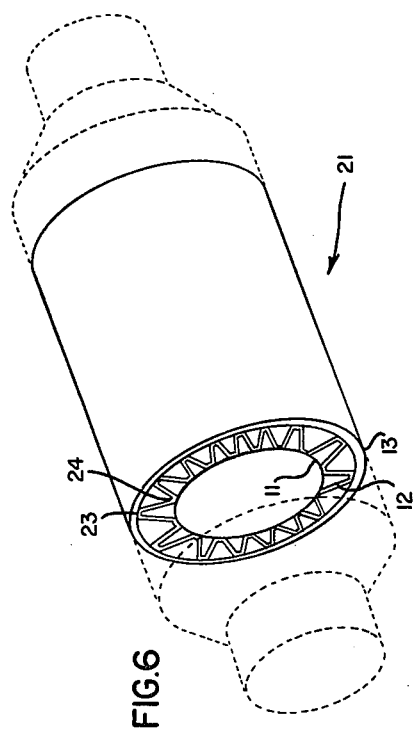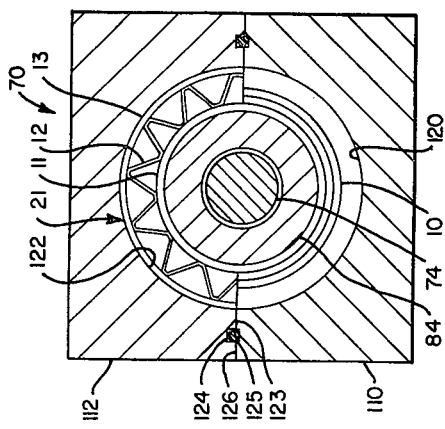

2

METHOD OF MAKING SANDWICH STRUCTURES BY SUPERPLASTIC FORMING AND DIFFUSION BONDING

BACKGROUND OF THE INVENTION

A. Field of the Invention

The invention relates to the field of metal forming, and particularly to an improvement to the method of making sandwich structures by superplastic forming and diffusion bonding.

B. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example some titanium alloys, such as Ti-6Al-4V, have been observed to exhibit superplastic characteristics.

Until the advent of viable superplastic forming techniques, taking advantage of this property to form complex configurations requiring large tensile elongations was extremely difficult or, in some instances, not possible. A significant breakthrough in superplastic forming was made by Hamilton, et al., disclosed in U.S. Pat. No. 3,934,441, "Controlled Environment Superplastic Forming," incorporated into this specification herewith by reference. Simplified, the process involves placing a worksheet or blank over a cavity in a chamber. The blank is heated to a temperature where it exhibits superplastic characteristics after which pressure is applied to the blank, causing it to stretch and form into the cavity.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, "Method of Making Metallic Sandwich Structures," by Hamilton, et al., and is herein also incorporated by reference.

Basically, the Hamilton, et al. method for making metallic, sandwich structure involves fabricating the structures from a plurality of metal blank workpieces. One or more of the blanks are coated in selected areas not to be diffusion bonded. The blanks are positioned in a stacked relationship and placed in a die assembly. The stack is diffusion bonded together in the uncoated areas by the application of pressure, and at least one of the blanks is superplastically formed against one or more of the die surfaces forming the sandwich structure. The core configuration is determined by the location, size, and shape of the joined areas.

The coatings to prevent bonding are typically called stopoffs. Typical stopoffs are yttria ($Y_2O_3$) and boron nitride in suitable binders. The method of preparing and applying yttria stopoff in the SPF/DB process is fully described in U.S. Pat. No. 4,220,276, "Method for Fabricating Superplastically Formed/Diffusion Bonded Structures," by E. D. Weisert, et al., and is herewith incorporated by reference. In summary the prior art methods have used silk screening techniques or templates. Silk screening is preferred because invariably when using templates some of the sprayed or painted stopoff "bleeds" beneath the template reducing the accuracy of the stopoff pattern. But silk screening techniques are not readily applicable to highly curved surfaces in particular tubular shapes.

Additionally while the stopoff coating thickness, as applied, is relatively thin, on the order of 0.004 inch, the coating does tend to create a gap between the workpieces. This can present problems if the stack compresses tubular shaped workpieces. Just sliding the tubes over one another can cause the stopoff to be scraped off. This would surely happen if close tolerances are held between the opposing principal surfaces of the tubes.

Therefore it is a primary object of this invention to provide an improved method of applying stopoff materials to prevent bonding between portions of the workpieces in the method of making sandwich structures by superplastic forming and diffusion bonding (SPF/DB).

Another object of this invention is to provide an improved method of applying stopoff materials to prevent bonding between the portions of workpieces not to be diffusion bonded together in the method of making sandwich structures by superplastic forming and diffusion bonding.

A further object of this invention is to provide a method of compensating for the increase in thickness of workpieces used in the method of making sandwich structures by superplastic or diffusion bonding caused by the application of stopoff material applied to the surfaces of the workpieces to prevent bonding at selected locations.

SUMMARY OF INVENTION

The invention is an improvement to the method of forming sandwich structure wherein a plurality of workpieces having opposed principal surfaces are placed in a stack contacting facing principal surfaces and thereafter diffusion bonding portions of the facing principal surfaces of the workpieces together and superplastic forming at least a portion of at least one of the workpieces. The improvement comprises coating at least one of the facing principal surfaces with a maskant. Thereafter the maskant is removed from the portions of the surface that are not to be diffusion bonded. A stopoff material is applied to the portions where the maskant has been removed after which the remaining maskant is removed from the at least one coated facing principal surface.

The preferred method of removing the maskant from the portions of the at least one coated facing principal surface comprises placing a template having a pattern corresponding to the portions of the at least one coated facing principal surface that is not to be diffusion bonded and thereafter cutting out the maskant.

While this method can be applied to flat workpieces, it is primarily suited for the use on curved workpieces and, in particular, tubular ones. If the workpieces are tubular, clearance must be provided between the principal surfaces of the workpieces in order that the workpieces can be assembled into a stack without damaging the stopoff coating. These clearances can be reduced by adding the additional step of etching the portions of the at least one facing principal surface where the maskant has been removed to a depth equal to the thickness of the stopoff coating to be applied. If this step is added, then the tolerance between the principal facing can be reduced almost to a line-to-line contact.

The novel features which are believed to be characteristic of the invention, both as to its organization and its method of operation, together with further objects and advantages thereof, will be better understood from the following description in connection with the accompanying drawing in which presently preferred embodiments of the invention are illustrated by way of examples. It is to be expressly understood, however, that the drawings are for purposes of illustration and description only, and are not intended as a definition of the limits of the invention.

BRIEF DESCRIPTION OF THE DRAWINGS

Illustrated in FIG. 1 is an exploded perspective view of a tubular three piece stack of workpieces.

Illustrated in FIG. 2 is a cross-sectional view of the assembled stack shown in FIG. 1.

Illustrated in FIG. 3a through 3d are perspective views of the tubular core workpieces of the stack shown in FIG. 1 illustrating the steps of applying a stopoff coating thereon.

Illustrated in FIG. 4 is the stack shown in FIG. 1 shown installed in a forming apparatus.

Illustrated in FIG. 5 is a cross-sectional view of the forming apparatus shown in FIG. 4 along the lines 5—5.

Illustrated in FIG. 6 is a perspective view of a completed sandwich structure formed from the stack shown in FIG. 1.

DESCRIPTION OF PREFERRED EMBODIMENT

Illustrated in FIG. 1 is an exploded perspective view of a three piece tubular shaped metal workpiece or blank stack 10 which is to be formed into a sandwich structure according to the present invention. FIG. 2 is a cross-sectional view of the assembled Stack 10. The stack 10 is made up of an inner metal blank 11, a core blank 12, and outer blank 13, which are preferably in the form of thin sheets having inner and outer opposed principal surfaces 15 and 16, 17 and 18, 19 and 20, respectively. The number of blanks used will vary depending on load conditions and design requirements of the structure to be formed. However, a minimum of two blanks must be utilized and normally three or more blanks would be used. The metal blanks must have the ability to be diffusion bonded. Depending on the number of blanks to be expanded, at least one of the blanks must have an effective strain rate sensitivity, i.e., exhibit superplastic properties at forming temperatures.

Any metal that exhibits superplastic properties within a workable temperature range can be used for such blanks but present invention is particularly concerned with metals that exhibit superplastic properties within the range required for diffusion bonding; e.g., titanium or alloys thereof, such as Ti-6Al-4V.

Illustrated in FIG. 5 is a completed metallic sandwich structure 21 formed from the stack 10 having blank 12 jointed at selected locations 23 and 24 to both blanks, 13 and 11, respectively. Referring back to FIGS. 1, 2 and 3, in order to only join at the selected locations on the blanks, the preferred procedure is to apply a suitable stopoff material to those areas within the stack 10 where no attachment or joining between the blanks is desired. Thus, areas 30 and 32 on the surfaces 17 and 18 respectively of blank 12 are shown coated with a stopoff material to prevent bonding in those areas. A typical stopoff material is yttria ($Y_2O_3$). The method of preparing yttria is disclosed in U.S. Pat. No. 4,220,276, "Method for Fabricating Superplastically Formed/Diffusion Bonded Structures," by E. D. Weisert, et al.

The prior method of applying stopoff coatings when the surfaces were relatively flat was to use silk screening techniques. Another approach was to use templates and spraying the coating on. The use of templates is the least desirable approach because when spraying, or hand painting for that matter, same stopoff material gets beneath the template and the resulting pattern is not well defined. When the surfaces are curved, silk screening techniques cannot be used.

This problem of applying stopoff material to curved surfaces was solved by the instant invention. FIGS. 3a to 3d, illustrate the various steps of applying stopoff material to the blank 12. It can be seen that the process basically involves four steps. Referring particularly to FIG. 3a, the blank 12 is first completely coated or at least on its interior surface 17 and exterior surface 18 with a maskant material 40. The maskant material is preferably an elastometric material of the type used in chemical milling operations. For example, TURCO No. 5096, manufactured by the Turco Products Company, a Division of Purex Corporation, Wilmington, CA. The maskant can be applied by brushing, spraying, or the blank 12 can be dipped.

Referring now to FIG. 3b, after the masket has dried, a template 42 is inserted within the blank 12 and onto surface 17 while a second template 44 is placed on surface 18. Templates 42 and 44 have a plurality of slots 46 which correspond to the size and position of the areas 30 and 32 not to be diffusion bonded to blanks 11 and 13. The templates 42 and 44 are preferably held in place by clamps or tape (not shown). Typically, a knife 50 is used to cut the maskant in the pattern defined by the slots 46. Hereafter the maskant can be easily peeled off. The outer template 44 has one oversized slot indicated by numeral 46a which has an extended portion indicated by numeral 52. The purpose of the extended portion 52 will be subsequently discussed.

Referring now to FIG. 3c, after the cutouts are made and the maskant peeled off exposing the areas 30 and 32 on surfaces 17 and 18, respectively, these areas are coated with the stopoff. This can be accomplished by spraying or hand painting with a brush.

Illustrated in FIG. 3d is a completed blank 12. After the stopoff coatings have been applied, the remaining maskant coating 40 is removed from the blank 12. For reasons which will subsequently be discussed, a series of holes 60 are drilled through the wall of the blank 12 to provide communication between areas 30 and 32. These holes should be made prior to applying the masket to the blank 12.

Illustrated in FIG. 4 is a cross-sectional view of the stack 10 installed in a forming apparatus 70, while illustrated in FIG. 5 is a cross-sectional view of the forming apparatus shown in FIG. 4 taken along the lines 5—5. Referring to FIGS. 4 and 5 it can be seen that the stack 10 is installed on an interior mandrel assembly generally designed by numeral 72. The mandrel assembly 72 consists of a rod 74 having a flange 76 at a first end 78. A first wedge member 80 having an aperature of 82 is slidably mounted on the rod 74 and abuts against the flange 76. An interior forming member 84 having an aperature 86 with the stack 10 mounted thereon is positioned on the rod 74 such that the inclined surface 87 of the wedge member 80 engages the surface 15 of the blank 11. A second wedge member 90 having an aperature 92 is slidably mounted on the rod 74 such that its inclined surface 94 also engages surface 15 at the opposite end of the blank 11. A sleeve 96 having an aperature of 98 is slidably mounted on the rod 74 such that it abutts the second wedge member 90. A nut 100 is threadably engaged with the second end 102 of the rod 74 such that it contacts sleeve 96. The second 102 of the rod 74 also incorporates wrench flats 103 such that the nut 100 can be rotated by use of a first wrench (not shown) while a second wrench (not shown) can be placed on the wrench flats 103 to resist rotation thereof. The mandrel assembly 72 is assembled in the order described above and the nut 100 is tightened slightly so that the wedge members 80 and 90 make contact with the surface 15 of the blank 11.

The mandrel assembly 72 with the stack 10 mounted thereon is placed in lower tooling frame 110 of the forming apparatus 70. The tooling frame 110 is typically rigidly mounted to a stationery platen 115 of a press (not shown). The upper tooling frame 112 is typically mounted by means (not shown) to a movable platen 118 of the press. The lower and upper tooling frames 110 and 112 have cavities 120 and 122 respectively which when the two tooling frames are brought together form a cavity conforming to the sandwich structure 21 shown in FIG. 6.

Still referring to FIGS. 4 and 5, if the stack 10 is composed in whole or in part of reactive metals it is important to ensure that the portions of the stack 10 to be diffussion bonded and superplastically formed are sealed off from the ambient environment in order to prevent surface contamination at elevated forming temperatures. In order to provide such protection, surface 123 of the upper tooling frame 112 incorporates a groove 124 having a sealing ring 125 mounted therein which seals against surface 126 of the lower tooling frame 110. Thus when the tooling frames 110 and 112 are brought into contact, the cavities 120 and 122 are sealed from the ambient environment by seal 125 and contact by surface 20 of blank 13 being wedged (in a manner to be subsequently described) against surfaces 128a, b and 129a, b of tooling frames 110 and 112, respectively. The interior of the stack 10 is sealed by the wedge members 80 and 90.

Details of the SPF/DB process are disclosed in U.S. Pat. No. 3,972,817, "Method for Making Metallic Sandwich Structures," by Hamilton, et al., and need not be discussed in significant detail here. Suffice it to say, after the stack 10 has been installed in the forming apparatus 70, clamped in place as shown in FIGS. 4 and 5, the forming apparatus is heated to a temperature suitable for diffusion bonding, preferably by use of resistance heated wires 130 in the platens 115 and 118. After forming temperatures are reached, the nut 100 is further tightened forcing wedges 80 and 90 to further wedge into blanks 11, 12, and 13 causing surface 20 of blank 13 to form a seal against surfaces 128a, b and 129a, b of tooling frames 110 and 112, respectively, further sealing off the stack 10 from the external environment. Pressurized fluid, preferably argon gas, is applied to cavities 120 and 122 through orifice tubes 131 and 132, respectively.

The fluid pressure level is maintained at a sufficient level to cause blanks 11, 12, and 13 to bond together in the uncoated areas. Typically, a vacuum is drawn from the interior of the stack 10 via port 140 in upper tooling frame 112. The port 140 is aligned with a hole 141 previously drilled in blank 13, thus, establishing communication with stopoff path 52 and coated areas 30 and 32 via holes 60 (shown in FIGS. 1-3).

After the stack 10 has been diffusion bonded, the temperature is adjusted to a value suitable for superplastic forming, (which may be identical to that required to diffusion bonding). Pressurized fluid (again argon gas) is applied through port 140, while a vacuum is, preferably, drawn from cavities 110 and 112 through orifice tubes 131 and 132. The pressurized fluid enters the interior of the stack 10 through port 141 passing into stopoff path 52 where it continues to breakthrough the coated areas 30 and 32 via holes 60. This causes blank 13 to superplastically expand into the cavities 120 and 122 to the configuration and take the shape of the completed sandwich structure 21 shown in FIG. 6. Blank 12, which has been previously diffusion bonded to blanks 11 and 13, will take on a corrugated configuration. This is illustrated in FIG. 4 wherein the stack 10 is shown in a split view. The portions shown in tooling frame 110 is unexpanded while the portion in the upper tooling frame 112 is shown diffusion bonded and superplastically expanded.

Referring back to FIGS. 1-3 it can be seen that in order to assemble the stack 10 from blanks 11, 12, and 13 after the stopoff coatings have been applied, clearance must be provided between the opposed principal surfaces 15 and 16, and 17 and 18. This clearance must be at least equal to the thickness of the stopoff coating, which is typically 0.004 inch, otherwise, upon assembly, the stopoff coating will be scraped off. This clearance between blanks can be reduced if prior to applying the stopoff coating and after the maskant has been applied and the areas to be coated have been stripped away, these exposed areas to be coated are chemically etched (Chem Milled) to a depth equal to the stopoff coating thickness. If the stopoff coating is then applied, the overall thickness of the blank 12 remains unchanged and it is possible to reduce the clearance between the individual blanks almost to a line-to-line contact without fear of scraping off the stopoff coating. This will aid in the diffusion bonding process in that the blanks need not be bent prior to coming into contact with each other during the step of diffusion bonding. Since Chem Milling is usually accomplished by dipping the part into a tank filled with the etching solution it is preferable to coat the entire blank 12 with a maskant to protect the edges thereof.

While the method of making superplastically formed and diffusion bonded structures, using the improved method of applying stopoff coatings to the areas not to be diffusion bonded together, has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

Therefore, what I claim is:

1. A method of forming a sandwich structure from a plurality of workpieces comprising:
 (a) stacking said plurality of workpieces, each of said workpieces having two opposed principal surfaces;
 (b) coating at least one of said principal surfaces with a maskant;

(c) removing said maskant from portions of said at least one coated principal surface that is not to be diffusion bonded;
(d) etching said portions of said at least one coated surface where the maskant has been removed to a depth equal to the thickness of said stopoff material to be applied;
(e) applying a stopoff material to said portions where said maskant has been removed;
(f) removing said remaining maskant from at least one coated principal surface;
(g) placing said workpieces in a die assembly under coordinated temperature-pressure-time conditions;
(h) maintaining said conditions for sufficient time to product diffusion bonding of selected portions of said workpieces; and,
(i) superplastic forming at least a portion of at least one of said workpieces.

2. The method of claim 1 wherein said step of removing said maskant from said portions not to be diffusion bonded of said at least one coated surface comprises:
placing a template on said at least one coated surface; said template having a pattern corresponding to said portions not to be diffusion bonded of said at least one coated surface and
cutting out said maskant from said portions not to be diffusion bonded of said at least one coated surface.

3. The method of claim 2 or 1 wherein said principal surfaces are tubular shaped.

4. The method of claim 2 or 1 wherein said principal surfaces are curved.

* * * * *